Dec. 16, 1952 R. E. SPRAGUE ET AL 2,621,854

ZERO DETECTOR FOR ELECTRONIC COUNTERS

Filed Dec. 20, 1948

INVENTORS
RICHARD E. SPRAGUE
DONALD E. ECKDAHL
BY Herbert E. Metcalf
ATTORNEY

Patented Dec. 16, 1952 2,621,854

UNITED STATES PATENT OFFICE 2,621,854

ZERO DETECTOR FOR ELECTRONIC COUNTERS

Richard E. Sprague, Redondo Beach, and Donald E. Eckdahl, Hawthorne, Calif., assignors to Northrop Aircraft, Inc., Hawthorne, Calif., a corporation of California Application December 20, 1948, Serial No. 66,254

8 Claims. (Cl. 235—61)

Our invention relates to zero detectors for electronic counters, and more particularly to zero detectors for multistage electronic counters which will provide an output signal whenever the counters are cleared or pass through the zero number content condition.

In electronic counting equipment, it is advantageous to know when the number content of a multistage counter becomes zero. In certain instances, when the counter goes through zero, the manner in which carry pulses between stages is made, must be reversed. The present invention offers a solution to this problem in that the circuit of the present invention detects the zero number content condition of the counter, and provides this information in the form of a static voltage output, a dynamic pulse output or a visual indication, depending upon the location in the circuit the output is taken.

The present invention is applicable to any multistage counter wherein an indicating element such as a neon glow tube, for example, can be used to indicate a zero condition at each digit stage of the counter. In broad terms, when none of the indicating elements are energized, indicating a zero number content condition of the counter, a vacuum tube is caused to conduct. This conduction is then used to create a substantial change in output voltage, to create a pulse or to give a visual indication.

It is an object of the present invention to provide a means and method of indicating the zero number content condition of an electronic counter and to provide such an indication as a change of voltage or a pulse.

Other objects and advantages of our invention will be more apparent from the ensuing description of the drawings, in which.

Figures 1, 3:
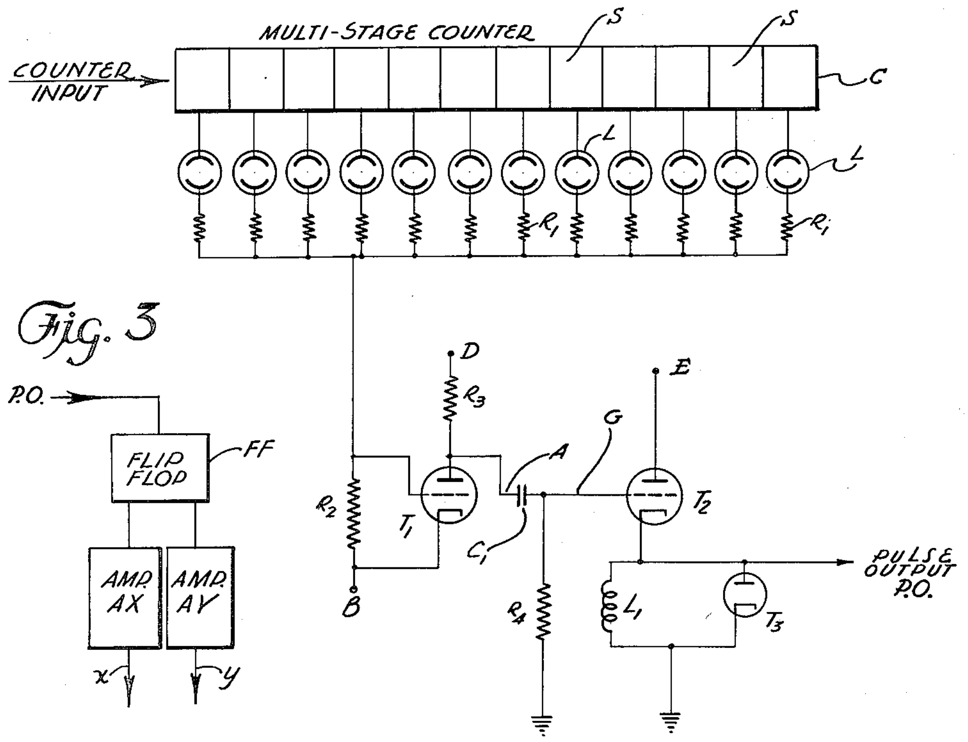
Figure 1 is a circuit diagram of one preferred form of our invention.
Figure 3 is a circuit diagram of one type of control circuit operated by the circuit of Figure 1.

In Figure 1, C represents a multistage counter of any type or system where a current carrying indicator such as a neon glow lamp L is attached to one point in each counter stage S of the counter C so that the lamp is off when the counter stage contains the digit zero and is on when the counter stage contains any other digit.

Normally, neon lamps of this nature are already used in counters.

To this end, each lamp L is connected through an individual resistance $R_1$ to a voltage source B of high positive voltage through a common resistor $R_2$. The grid and cathode of a vacuum tube $T_1$ are connected across resistor $R_2$. The anode of tube $T_1$ is connected through anode resistor $R_3$ to a second voltage source D which is preferably maintained at a higher voltage than that of source B.

The output of tube $T_1$ is taken from between the anode of tube $T_1$ and anode resistor $R_3$ and is led to the grid of a second tube $T_2$ through a differentiation circuit comprising a series capacitor $C_1$ and a shunt resistance $R_4$. The anode of tube $T_2$ is directly connected to a voltage source E and the cathode of tube $T_2$ is connected to ground through an inductance $L_1$. A diode $T_3$ is connected across inductance $L_1$, with the anode thereof continued as a pulse output PO.

Figure 2:
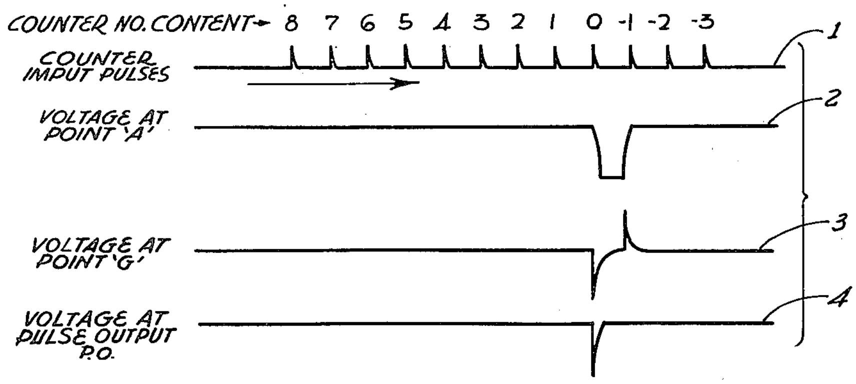
Figure 2 is a graph sequence of voltage conditions at various points in the circuit of Figure 1.

In operation, graph 1 of Figure 2 shows the number content of the counter C as successive pulses are applied at its input in a subtractive fashion. As these subtractive input pulses are fed into the counter previous to zero content, some of the lamps L are lit and a current flows through resistor $R_2$ through resistor $R_1$ and through each lit lamp to the connected counting stage S. The voltage drop across resistor $R_2$ due to the current flowing through it, keeps the voltage of the grid of tube $T_1$ sufficiently negative that tube $T_1$ does not conduct. Under this condition the voltage at point A can be made to be the same as at point D, as indicated in graph 2 of Figure 2. This condition exists irrespective of the number of lamps lit.

However, if no lamps are lit, as when zero number content is in the counter, no current flows through resistance $R_2$ and the grid of tube $T_1$ is energized to be of the proper voltage so that tube $T_1$ conducts. The change of voltage at point A of the circuit of Figure 1, as shown in graph 2 of Figure 2, is then differentiated in the circuit combination of condenser $C_1$ and resistor $R_4$ with a voltage curve, as shown in graph 3 of Figure 2. This voltage energizes tube $T_2$ and a pulse output PO, as shown in graph 4 of Figure 2, results due to the action of the ringing circuit $T_2$, $T_3$ and $L_1$. Thus, either a voltage change is produced (at point A) or a pulse is made available at pulse output PO. One or both of these outputs can be used as a signal, or for the energization of additional circuits that can shift conditions in counter C when the zero condition is passed through or reached, or both.

It is to be noted that in the circuit of Figure 1, the neon glow lamps L serve automatically to isolate each stage, while in the zero condition, from potential changes due to operation of other stages.

By way of example, assume that one of the neon lamps L is non-conducting, i. e., the stage S to which it is connected is in the zero condition. Now, assume that, as the counting proceeds, one of the other neon lamps L changes from a non-conducting to a conducting condition, due to the fact that the stage S to which it is connected changes to a number or conducting condition. At this instant a negative pulse is created on the common lead connecting all the neon lamps to the indicator tube. This negative pulse might be communicated to the non-conducting neon bulb connected stage and thus undesirably change the condition of that stage, were it not for the fact that the non-conducting neon bulb has a very high impedance, and the negative pulse created on the common lead is not of sufficient magnitude to fire a neon lamp.

In Figure 3, the output PO from the ringing circuit is led to a flip-flop circuit FF of any well-known type, the output of this circuit FF being connected to energize a pair of amplifiers $A_x$ or $A_y$ in accordance with the condition of the flip-flop circuit. The respective outputs $x$ and $y$ can then be used to change conditions in counter C as desired. One exemplary condition may be to stop the counting at zero.

Figure 4:
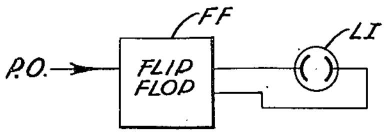
Figure 4 is a circuit diagram of one type of visual indicator operated by the circuit of Figure 1.

In Figure 4, the flip-flop stage FF energized by pulse output PO is used to energize a zero indicating lamp LI, this lamp being lit, for example, as the counter passes through the zero condition from a positive number to a negative number, and being unlit as the counter passes through zero from negative to positive number content.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. In combination with a counting device having one or more stages having a portion passing substantial current for a number condition of each stage and passing negligible current for the zero condition of each stage, each of said portions including a visual indicator glow lamp of the diode type connected to be off for the zero condition only, zero indicator means for said device wherein the circuit for supplying current for said glow lamps comprises a common d. c. potential source forming the positive side of said circuit, and including resistance means common to all of said glow lamps and connected to said potential source between said lamps and said source, a three electrode vacuum tube held in non-conducting condition by the voltage drop across said common resistance, the constants of said tube being arranged so that said tube is conducting when no substantial voltage drop occurs across said common resistance, a differentiation circuit fed by said vacuum tube, and a ringing circuit having a pulse output fed by said differentiation circuit.

2. Apparatus in accordance with claim 1 wherein a flip-flop stage is connected to be operated by said pulse output.

3. Apparatus in accordance with claim 1 wherein a flip-flop stage is connected to be operated by said pulse output, and wherein a visual indicator is connected to be operated by the condition of said flip-flop stage.

4. Apparatus in accordance with claim 1 wherein a flip-flop stage is connected to be operated by said pulse output, and wherein a pair of amplifiers are connected to be energized in accordance with the condition of said flip-flop stage.

5. In combination with a counting device having one or more stages having a portion passing substantial current for a number condition of each stage and passing negligible current for the zero condition of each stage, each of said portions including a visual indicator glow lamp of the diode type connected to be off for the zero condition only, zero indicator means for said device wherein the circuit for supplying current for said glow lamps comprises a common d. c. potential source forming the positive side of said circuit, and including resistance means common to all of said glow lamps and connected to said potential source between said lamps and said source, a three electrode vacuum tube held in non-conducting condition by the voltage drop across said common resistance, the constants of said tube being arranged so that said tube is conducting when no voltage drop occurs across said common resistance, a differentiation circuit fed by said vacuum tube, a ringing circuit having a pulse output fed by said differentiation circuit, and indicating means operated by said pulse output.

6. In combination with a counting device having one or more stages having a portion passing substantial current for a number condition of each stage and passing negligible current for the zero condition of each stage, each of said portions including a visual indicator glow lamp of the diode type connected to be off for the zero condition only, zero indicator means for said device wherein the circuit for supplying current for said glow lamps comprises a common d. c. potential source forming the positive side of said circuit, and including resistance means common to all of said glow lamps and connected to said potential source between said lamps and said source, a three electrode vacuum tube having the grid and cathode thereof connected across said resistance, a second source of voltage higher than that of said first source connected to the anode of said vacuum tube, said tube being biased to conduct in the absence of a voltage drop across said resistance and to be non-conductive when a resistance drop is present across said resistance, and an output circuit connected to said anode.

7. In combination with a counting device having one or more stages having a portion passing substantial current for a number condition of each stage and passing negligible current for the zero condition of each stage, each of said portions including a visual indicator glow lamp of the diode type connected to be off for the zero condition only, zero indicator means for said device wherein the circuit for supplying current for said glow lamps comprises a common d. c. potential source forming the positive side of said circuit, and including resistance means common to all of said glow lamps and connected to said potential source between said lamps and said source, a three electrode vacuum tube having the grid and cathode thereof connected across said resistance, a second source of voltage higher than that of said first source connected to the anode of said vacuum tube, said tube being biased to conduct in the absence of a voltage drop across said resistance and to be non-conductive when a resistance drop is present across said resistance, an output resistance between said anode and said second source and an output connection to said anode.

8. In a counting device having a plurality of stages each having a portion passing substantial current for a number condition of its stage and passing negligible current for the zero condition of that stage; zero indicator means for said device comprising a series combination of a visual indicator glow lamp of the diode type and an external resistance for each of said stages, one end of each said combination connected in its corresponding stage portion, a common d. c. potential source, a common resistance connected between said potential source and the other ends of each of said combinations, said potential source and said resistances being proportioned so that each of said glow lamps is on for said number condition of its associated stage and off for said zero condition; and a three-electrode vacuum tube, said common resistance being connected between the grid and cathode of said tube, the constants of said tube being arranged so that said tube is conducting when no voltage drop occurs across said common resistance, and nonconducting when a voltage drop across said common resistance occurs as a result of one or more glow tubes being on.

RICHARD E. SPRAGUE.
DONALD E. ECKDAHL.

REFERENCES CITED

The following references are of record in the file of this patent:

UNITED STATES PATENTS

| Number | Name | Date |
|---|---|---|
| 2,402,988 | Dickinson | July 2, 1946 |
| 2,422,698 | Miller | June 24, 1947 |
| 2,500,294 | Phelps | Mar. 14, 1950 |